(12) United States Patent
Sabys et al.

(10) Patent No.: US 12,516,210 B2
(45) Date of Patent: Jan. 6, 2026

(54) THERMOCHROMIC INK COMPOSITION FOR INK JET PRINTING

(71) Applicant: Dover Europe Sàrl, Vernier (CH)

(72) Inventors: Jean-Yves Sabys, La Roche de Glun (FR); Virginie Rio, Etables (FR)

(73) Assignee: Dover Europe Sàrl, Vernier (CH)

( * ) Notice: Subject to any disclaimer, the term of this patent is extended or adjusted under 35 U.S.C. 154(b) by 1032 days.

(21) Appl. No.: 17/078,310

(22) Filed: Oct. 23, 2020

(65) Prior Publication Data
US 2021/0130633 A1     May 6, 2021

(30) Foreign Application Priority Data
Oct. 31, 2019 (EP) .................................. 19306420

(51) Int. Cl.
| | | |
|---|---|---|
| C09D 11/50 | (2014.01) | |
| C09D 11/033 | (2014.01) | |
| C09D 11/037 | (2014.01) | |
| C09D 11/106 | (2014.01) | |
| C09D 11/322 | (2014.01) | |
| C09D 11/328 | (2014.01) | |
| C09D 11/36 | (2014.01) | |

(52) U.S. Cl.
CPC ............ *C09D 11/50* (2013.01); *C09D 11/033* (2013.01); *C09D 11/037* (2013.01); *C09D 11/106* (2013.01); *C09D 11/322* (2013.01); *C09D 11/328* (2013.01); *C09D 11/36* (2013.01)

(58) Field of Classification Search
CPC ....... C09D 11/36; C09D 11/50; C09D 11/033; C09D 11/037; C09D 11/106; C09D 11/322; C09D 11/328
See application file for complete search history.

(56) References Cited

U.S. PATENT DOCUMENTS

| | | | | |
|---|---|---|---|---|
| 4,155,895 A | * | 5/1979 | Rohowetz | ............... C09D 11/50 347/100 |
| 4,179,397 A | | 12/1979 | Rohowetz et al. | |
| 4,756,758 A | * | 7/1988 | Lent | ........................ C09D 11/50 106/31.32 |
| 5,302,631 A | * | 4/1994 | Yamada | .................. C09D 11/36 524/508 |
| 5,935,310 A | * | 8/1999 | Engel | ...................... C09D 11/36 106/31.28 |
| 2006/0233917 A1 | * | 10/2006 | Shobu | .................. A61K 9/2013 426/138 |
| 2014/0065381 A1 | | 3/2014 | De Saint Romain et al. | |
| 2014/0204149 A1 | * | 7/2014 | Yokoi | .................. C09D 11/101 522/18 |
| 2015/0368486 A1 | | 12/2015 | De Saint Romain | |

FOREIGN PATENT DOCUMENTS

| | | |
|---|---|---|
| EP | 0289141 A2 | 11/1988 |
| GB | 2219084 A | 11/1989 |
| GB | 2325670 A | 2/1998 |

OTHER PUBLICATIONS

European Search Report for EP 19 30 6420 dated Mar. 31, 2020.
Corresponding Chinese Patent Application No. 202011195311, Office Action, date issued May 31, 2024.
Huang Rui, "Plastic Engineering Handbook, vol. 1", Machinery Industry Press, Apr. 30, 2000, p. 746.

\* cited by examiner

*Primary Examiner* — Kregg T Brooks
*Assistant Examiner* — David R. Foss
(74) *Attorney, Agent, or Firm* — McDonald Hopkins LLC

(57) ABSTRACT

Thermochromic ink composition for ink jet printing, liquid at room temperature, comprising:
   a) a solvent;
   b) a binder;
   c) a heat resistant, and water or steam resistant pigment;
   d) a heat sensitive, and water or steam sensitive, dye;
wherein the pigment and the dye are selected to be complementary in the colour spectrum, and wherein said dye is capable of undergoing decomposition upon exposure to both heat and water or steam so that the colour of the ink composition or of a marking printed using said ink composition changes to the colour of the pigment upon exposure to both heat and water or steam.
Method for marking a substrate by spraying said ink composition onto this substrate, and substrate provided with a marking obtained by drying and/or absorption of said ink composition.
Method of indicating sterilization or pasteurization or autoclaving of a substrate using said ink.

25 Claims, No Drawings

THERMOCHROMIC INK COMPOSITION FOR INK JET PRINTING

CROSS-REFERENCE TO RELATED APPLICATIONS

This application claims priority from European Patent Application No. 19306420.1 filed on Oct. 31, 2019. The content of this application is incorporated herein by reference in its entirety.

TECHNICAL FIELD

The invention relates to a thermochromic ink composition for marking supports and objects of all types, the properties of which are particularly suitable for ink jet marking or printing, known as "ink jet" printing or marking, on a very wide variety of supports, substrates and objects, and particularly flexible supports, substrates and objects.

The ink composition according to the invention is especially suitable for marking, printing with the deflected continuous ink jet printing technique.

The ink composition according to the invention is notably suitable for marking substrates, supports, and objects made of organic polymers, in particular made of thermoplastic polymers («plastic materials»), such as polyolefins like polyethylenes (PE) or polypropylenes (PP), or poly(ethylene terephthalate) (PET); or made of metals, such as aluminum, or made of metal alloys such as steel.

The ink composition according to the invention is particularly suitable for marking bottles, packages, flasks or trays made of organic polymers, notably made of polyolefins, such as polyethylenes or polypropylenes; or made of metals such as aluminum, or made of metal alloys, such as steel.

The ink composition according to the invention is a thermochromic ink composition i.e., an ink composition that changes color under the influence of heat and water or steam in other words that is heat and moisture sensitive.

Thus, the ink composition according to the invention is particularly useful as a sterilization or pasteurization or autoclaving indicator for printing objects, especially packages, which are subjected to high temperatures and moisture conditions, for example, during sterilization or pasteurization or autoclaving processes. Such packages are for example packages for food products, pharmaceutical products, medical products, and surgical products.

The ink composition according to the invention gives the possibility of obtaining markings notably resistant to friction and to customary solvents such as ethanol, greases and oils, and adherents, i.e. markings successfully undergoing the detachment test with an adhesive tape before and after having been submitted to heat and moisture, for example during a sterilization, pasteurization or autoclaving (retorting) process.

STATE OF THE PRIOR ART

Ink jet printing is a well-known technique which allows printing, marking or decorating of all kinds of objects, at high speed and without contact of these objects with the printing device, with messages which can be changed at will such as bar codes, sell-by dates etc., even on non-planar supports.

Ink jet printing, spraying techniques are divided into two major types, namely the technique known as Drop On Demand or DOD technique, and the technique known as Continuous Ink Jet (CIJ) technique.

Jetting using the Drop On Demand technique may be done using a so-called "bubble" ink jet, a "piezoelectric" ink jet, a "valve" ink jet, or finally a so-called "Hot Melt" (HM) or phase change ink jet.

In the case of bubble ink jet, ink is vaporised close to the nozzle and this vaporisation causes the ejection of a small quantity of ink located between the resistor that vaporises the ink and the nozzle. In the case of a piezoelectric ink jet, a sudden pressure variation caused by an actuator moved by the electrical excitation of a crystal or a piezoelectric ceramic located close to the nozzle, causes the ejection of an ink drop.

In the case of the "Hot Melt" ink jet, the ink is solvent free and is heated to above its melting point.

"Drop On Demand" printing may therefore be carried out at ambient, room, temperature, this is the case of the piezoelectric ink jet, of the valve ink jet, or of the bubble ink jet, or at high temperature, for example from about 60° C. to 130° C., this is the case of the so-called Hot Melt (HM) or phase change ink jet.

Continuous deflected ink jet spraying consists ink sending ink under pressure into a cavity containing a piezoelectric crystal, from which ink escapes through an orifice (nozzle) in the form of a jet.

The piezoelectric crystal, vibrating at a determined frequency, provokes pressure disturbances in the ink jet, which oscillates and gradually breaks up into spherical droplets. An electrode called the "charging electrode" placed on the path of the jet at the location at which it breaks, imparts an electrostatic charge to these droplets, if the ink is conductive. The droplets thus charged are deflected, deviated in an electric field to enable printing.

Uncharged drops that are therefore not deflected or deviated, are recovered in a gutter from which ink is sucked up, drawn, and then recycled to the ink circuit.

For all ink jet printing techniques and technologies, including the binary continuous deviated, deflected, liquid jet printing technique with uncharged drops called the "SPI" technique, the viscosity of inks at the ink projection temperature is very low, typically from 1 to 10 cPs (mPa·s), or 15 cPs, or 20 cPs, and therefore all these printing techniques that make use of ink jetting, spraying, can be described as low viscosity ink deposition technologies.

Ink jetting, projection, spraying, enables contactless marking at a high running rate on objects that are not necessarily planar with the possibility of changing the message at will.

Ink compositions that can be sprayed, jetted, particularly in the continuous deflected, inkjet printing technique have to satisfy a number of criteria inherent to this technique related to (among other factors) viscosity, solubility in a solvent for cleaning, compatibility of ingredients, proper wetting of supports to be marked, etc., and electric conductivity in the case of the continuous deflected, deviated, continuous inkjet printing technique.

Furthermore, these inks must dry quickly, be capable of flowing or remaining motionless close to the nozzle without clogging it, with good stability of the jet orientation to enable easy cleaning of the printing head.

Ingredients of inks currently used in the continuous deflected, deviated, ink jet printing technique, are organic or inorganic, mineral products; they are colouring materials such as dyes or pigments, resins or binders, in one or several more or less volatile organic solvent compound(s) or in water, optionally one or several salt(s) imparting conductivity (commonly called conductivity salts), as well as various additives, such as surface tension modifiers, surface active agents such as polyether modified polysiloxanes.

Ingredients used in the composition of currently used inks for the drop on demand (DOD) type ink jet printing technique are also organic or inorganic, mineral products; dyes or pigments, resins or binders, in one or several more or less volatile organic solvent compound(s) or in water, in proportions other than those used for inks for the continuous deflected, deviated ink jet printing technique, but without the need for electrical conductivity.

In the case of inks for the "Hot Melt" (HM) ink jet printing technique, the inks do not contain any solvents liquid at ambient temperature, but they rather contain liquid organic products at the jetting, spraying, projection, temperature mentioned above, such as waxes and resins of low molecular weight. These waxes and resins of low molecular weight are generally chosen such that the viscosity of the ink at the jetting, spraying, projection temperature is from 2 to 25 mPa·s.

The solvent of inks for ink jet printing, except for inks for Hot Melt ink jet printing, is usually composed of a mixture comprising firstly a majority quantity of volatile solvent compounds with low viscosity, to enable very fast drying of the markings, and to adjust the viscosity to the required value, for example from 1 to 10 cPs (mPa·s), or 15 cPs, or 20 cPs, and secondly solvent compounds with a higher viscosity and less volatile, that dry more slowly and are in lower quantities, to prevent the ink from drying in the nozzle during phases in which the printer is switched off.

The most frequently used volatile solvent compounds are alcohols, ketones or esters with low molecular weight.

Among these solvent compounds, essentially methanol, ethanol, 1- and 2-propanol, acetone, methyl-ethyl ketone ("MEK"), methyl isobutyl ketone, ethyl acetate, and tetrahydrofuran may be cited.

Less volatile solvent compounds that in particular have a drying retarder function are most frequently ketones such as cyclohexanone, glycol ethers, ethers and acetals, such as furan or dioxan, dimethyl formamide or dimethylsulphoxide, lactones, N-Methyl Pyrrolidone, glycols, and even aliphatic hydrocarbons or water, alone or in combination with other solvent compounds mentioned above.

Additives include:
Plasticizers that make the dry ink film more flexible, in other words that soften the dry ink film, to improve adherence and cohesion of the ink on the marked support.
Dispersants that disperse the pigments. Such dispersants stabilise the pigments by steric effect and/or electrostatic effect depending on whether they can be ionised or not, and depending on the polarity of the solvent.
Agents that inhibit corrosion induced by some salts, such as salts that confer conductivity (called conductivity salts) described below such as chlorides.
Additives that protect the ink against proliferation of bacteria and other micro-organisms: these include biocides, bactericides, fungicides and others, particularly useful in inks containing water.
Surface tension modifiers, surface active agents such as polyether modified polysiloxanes.
pH regulation buffers.
Anti-foaming agents.
Inks for ink jet printing may also include surfactants or surface active agents that modify the wetting or penetrating capacity of the ink, in particular surfactants or surface active agents that modify or regulate the static or dynamic surface tension such as Fluorad® FC 430 made by the 3M company. Such products regularise the size of drop impacts. Due to these products, the impact diameter is the same for all drops regardless of the nature, cleanliness, or regularity of the support.

Additives for inks for the continuous deviated, deflected, ink jet printing technique may also include one or several salts called conductivity salts.

The conductivity salt(s), if any, provide the ink with the conductivity necessary for electrostatic deviation, deflection.

However, it can be noted that in some cases, other ink constituents such as dyes or pigments already confer enough conductivity to the ink so that there is no need to add a conductivity salt.

Colouring materials are called "dyes or pigments" depending on whether they are soluble or insoluble, respectively, in the solvent used.

Pigments are inherently insoluble and are therefore dispersed, and may or may not be opaque.

Dyes and/or pigments impart its colour to the ink, its opaqueness, or particular optical properties such as fluorescence. In some cases, dyes also confer sufficient conductivity to the ink so that there is no need to add a conductivity salt. This is the case of dyes known under the name C.I. Solvent Black 27, 29, 35 and 45.

Binder(s) or resin(s) is (are) generally, mostly, one or more solid polymeric compound(s) and their choice depends on their solubility in the selected solvents, their compatibility with the dyes and the other additives, their ability to give the right electrostatic charge to the drops, and also depending on the properties that they confer on the ink film once it is dry.

Their primary function is to provide adherence for the ink on a maximum number of supports or on special supports, for example non-porous supports. They also confer appropriate viscosity to the ink for the formation of drops from the jet and they provide the marking obtained with most of its properties of resistance to physical and/or chemical aggression such as resistance to friction and more generally to abrasion.

The resins, such as polymers, used e.g. with organic solvents, may be synthetic or natural, they may be linear polymers or branched polymers such as dendrimers.

Examples of resins, such as polymers, in particular resins, such as polymers, which may be used with organic solvents, are rosin resins, shellac resins, resins of the acrylic, methacrylic, styrenic, vinylic, cellulosic, and phenolic types, polyamides, polyurethanes, melamines, or polyesters.

The resistance of markings obtained by the ink jet printing technique to heat and steam or water (moisture) especially to sterilization or pasteurization or autoclaving processes is also a major constraint for markings which are printed on packages that needed to be sterilized such as food, pharmaceutical, medical and surgical packages.

In order to determine whether proper, complete sterilization or pasteurization or autoclaving has been carried out on the objects, such as packages having undergone such processes, ink jet ink composition for such purposes should also play the role of so-called printable sterilization or pasteurization indicators.

In the food packaging industry, for example, but also in the pharmaceutical packaging industry, cans, plastic pouches or coated metal and packages of all kind are printed, filled with product, sealed, and then the packages are subjected to conditions of high temperature and moisture during pasteurization or sterilization or autoclaving techniques. In said industries, there is therefore a need for ink jet ink compositions that exhibit sufficient adhesion to the substrate, in order to withstand the moisture and high temperature conditions used in processes such as sterilization, autoclaving and pasteurization processes and which at the same time, undergo a visible and permanent colour change.

The provision of such an ink composition which shows a distinct difference in colour between an unsterilized package, object and a completely, properly sterilized package, object provides for readily visible inspection, and permits tracing a particular package, object after it has been processed.

Compositions playing the role of pasteurization or sterilization or autoclaving indicators have heretofore usually used pigments and pigments combinations, and have been mainly applied in determining whether proper sterilization, pasteurization or autoclaving has been carried out to objects used in medical and surgical procedures.

Thus, thermochromic inks and paints are known as pasteurization or sterilization or autoclaving (retorting) indicators.

For example, EP-A1-0 289141 discloses a thermochromic ink jet ink composition suitable for ink jet printing process comprising a combination of a heat-resistant and a heat sensitive dye, said heat sensitive dye being capable of undergoing decomposition upon exposure to a predetermined elevated temperature for a predetermined period of time so that the colour of the ink changes to that of the heat-resistant dye.

The heat-resistant dye may be selected from the group consisting of Solvent Red 33, Basic Violet 4, Solvent Blue 98, and Solvent red 164, and the heat-sensitive dye may be selected from the group consisting of Basic Green 4 and Solvent Yellow 56.

The inks of the Examples of EP-A1-0 289141 contains a phenolic resin as a binder and a mixture of Methyl Ethyl Ketone and Methanol as a solvent.

It should be noted that the ink composition of EP-A1-0 289141 exhibits a colour change upon exposure only to an elevated temperature and not upon exposure to both an elevated temperature and steam, moisture, or water.

Thus, the colour changes the ink composition of said document is not specific to process involving both a high, elevated temperature and the presence of steam, moisture or water such as sterilization, autoclaving, and pasteurization processes.

The ink compositions of EP-A1-0 289141 do not actually provide a reliable, positive and visible indication that sterilization or pasteurization or autoclaving has been actually, properly carried out because a colour change could even occur without any exposure of the ink composition to steam, water, or moisture, i.e. even if no sterilization or pasteurization or autoclaving has actually been carried out.

Moreover, the colour changes of the marked objects when subjected to conditions of sterilizing, retorting, pasteurizing or autoclaving are not so clear.

The overall printing quality achieved with the ink composition of EP-A1-0 289141 is quite poor.

The markings are spreading on polymer substrates, and oiled, greasy substrates.

The ink is smudging especially on polymer substrates, such as PET substrates.

The printing definition is not high.

The adhesion to the printing substrate is not sufficient.

The markings do not resist to rubbing especially with oily cloths.

In the light of the above, there is a need for a thermochromic ink jet ink composition which exhibits a clear, unambiguous colour change upon exposure to both heat (elevated temperature), and steam, moisture, or water—as in sterilization, pasteurization, and autoclaving (retorting) processes—and not only upon exposure to an elevated temperature.

There is therefore a need for a thermochromic ink jet ink composition whose colour change is specifically due to both heat (high, elevated temperature) and the presence of steam, moisture or water, as in sterilization, autoclaving (retorting) and pasteurization processes.

There is still a need for a thermochromic ink jet ink composition providing a reliable, positive, clear and visible indication that sterilization or autoclaving (retorting), or pasteurization has been actually, properly carried out.

There is also a need for a thermochromic ink jet ink composition achieving overall a high printing quality. For example, the markings obtained with such an ink jet ink composition should not spread especially on polymer substrates, and oiled substrates.

The ink should not smudge, especially on polymer substrates, such as PET substrates.

The adhesion of the markings to the printing substrate should be high even when submitted to rubbing with an oily or greasy cloth.

In other words apart from the needs already specified above that are specific to thermochromic inks playing the role of pasteurization or sterilization or autoclaving indicators, there is a need for an ink jet ink composition that can be projected, jetted, sprayed, by all ink jet technologies such as the CIJ and the DOD techniques, and which enables the marking of all substrates, such as packages of all kinds, made of all kinds of material such as polymers (PET, PP, PE), metals (e.g. aluminium), alloys (e.g. steel), at ambient temperature, and which can withstand high temperatures such as the steam sterilisation temperature, in other words a temperature generally of 90° C. to 135° C., and the simultaneous action of steam, water or moisture.

An unsatisfied need still exists for a thermochromic ink composition suitable for ink jet printing, whether by drop on demand or by continuous deflected ink jet, which gives markings having good adherence and good resistance to chemical aggressions, particularly good resistance to water, organic solvents (such as ethanol), oily and greasy substances, moisture and steam, good resistance to abrasion, folding, rubbing (dry rubbing as well as rubbing with an oily or greasy cloth) or high temperatures in the presence of steam as for example during steam sterilisation processes, autoclaving (retorting) processes, and pasteurization processes.

Moreover the obtained markings, especially when printed on beverage bottles or packages of cosmetic, food, surgical, medical, or pharmaceutical products should resist not only to the liquids contains in these packages such as oils, organic solvents, water, alcohols (ethanol), fatty or greasy substances contained in these packages, but also to the inevitable friction due to the user.

This ink composition must, further, have all the properties normally required of inks for ink jet printers, for example for inks for printers using the continuous deflected ink jet technique, namely viscosity, resistivity, etc. The ink must have at the same time the property of drying quickly, to not obstruct the nozzles and to enable a rapid start up even after a long stoppage.

The ink composition must, in addition, enable marking at high speed of objects of all kinds, even slightly porous, while always giving printing or marking of excellent quality, definition, and regularities.

The goal of the invention is to provide a thermochromic ink composition for liquid ink jet printing that meets among other things the needs and requirements listed above.

The goal of the invention is also to provide an ink composition for ink jet printing that does not have the drawbacks, defects, limitations and disadvantages of the compositions of the prior art and which provides a solution to the problems of the compositions of the prior art.

SUMMARY OF THE INVENTION

This goal and still other ones are achieved, according to the invention, by a thermochromic ink composition for ink jet printing, liquid at room temperature, comprising:
  a) a solvent comprising one or several organic solvent compound(s);
  b) a binder, comprising at least one binding resin;
  c) a heat resistant, and water or steam resistant pigment;
  d) a heat sensitive, and water or steam sensitive, dye;
  wherein the pigment and the dye are selected so that the colour of the pigment and the colour of the dye are complementary in the colour spectrum, and wherein said heat sensitive, and water or steam sensitive dye is capable of undergoing decomposition upon exposure to both heat and water or steam so that the colour of the ink composition or of a marking printed using said ink composition changes to the colour of the heat resistant, and water or steam resistant pigment upon exposure to both heat and water or steam.

Steam or water could mean steam and/or water.

Generally, the heat resistant, and water or steam resistant pigment exhibits a vividly different colour (e.g. red or blue) from the colour of the combination of the heat resistant, and water or steam resistant pigment and of the heat sensitive, and water or steam sensitive, dye. The colour of said combination is generally black or substantially black because the colours of the dye and the colour of the pigment are complementary in the colour spectrum.

The dye and the pigment are different from each other.

Ink jet printing includes the continuous, deflected, deviated, ink jet ("CIJ") printing technique and the Drop-On-Demand ("DOD") ink jet printing technique.

The continuous, deflected, deviated, ink jet printing technique also includes the binary deviated continuous ink jet printing technique with uncharged drops called the "SPI" technique.

By «room temperature» is generally meant a temperature from 5° C. to 30° C., preferably from 10° C. to 25° C., still preferably from 15° C. to 24° C., better from 20° C. to 23° C. It is quite understood that the ink is liquid at atmospheric pressure.

The term "pigment" refers to a colorant that is generally insoluble in water and in organic solvents, especially in the solvent of the ink composition according to the invention and is solid at ambient temperatures.

The term "dye" refers to a colorant that is generally soluble in water or in organic solvents, especially in the solvent of the ink composition according to the invention.

By heat resistant, and water or steam resistant pigment, is meant that said pigment does not (chemically) decompose, does not undergo any structural change, and that the colour of said pigment does not change (remains the same), upon exposure to, in the presence of, heat and water or steam.

More precisely by heat resistant, and water or steam resistant pigment, is meant that said pigment does not (chemically) decompose, does not undergo any structural change, and that the colour of said pigment does not change, under the conditions used during sterilization or pasteurization or autoclaving (retorting) processes.

Said conditions generally include the conditions regarding heat (e.g. temperature), steam or water (e.g. pressure, concentration, humidity level), and period of time used in sterilization or pasteurization or autoclaving processes to complete the sterilization or pasteurization or autoclaving processes. Said conditions are well known from the man skilled in the art in this technical field. Examples of said conditions are disclosed herein below.

By "heat sensitive, and water or steam sensitive, dye" is meant that said dye chemically decomposes, undergo major structural changes, and that the colour of said pigment vanishes, disappears, upon exposure to, in the presence of, heat and water or steam.

More precisely, the heat-sensitive dye is capable of undergoing decomposition, degradation, upon exposure to a specific, high, elevated temperature (preferably a temperature above a predetermined minimum) and to steam or water for a period of time (whose length may be dependent on that elevated temperature) so that the colour of the ink composition or of a marking printed using said ink composition (upon exposure to an elevated temperature and to steam or water for a period of time) changes to the colour of the heat resistant, and water or steam resistant pigment.

More exactly, by "heat sensitive, and water or steam sensitive, dye", is meant that said dye decomposes, undergo major structural changes, and that the colour of said dye vanishes, disappears, under the conditions used during sterilization or pasteurization or autoclaving (retorting) processes.

Said conditions generally include the conditions regarding heat (e.g. temperature), steam or water (e.g. pressure, concentration, or humidity level), and period of time used in sterilization or pasteurization or autoclaving processes to complete the sterilization or pasteurization or autoclaving processes. Said conditions are well-known from the man skilled in the art in this technical field. Examples of said conditions are disclosed herein below.

The ink composition according to the invention, or more exactly a marking obtained by spraying the ink composition according to the invention on a substrate can, for example, display a desired message having a predetermined colour on a substrate, such as a container, or package, in response to heat and steam or water, generally in response to a specific temperature and to steam or water during a specific time period.

This specific temperature which may generally be defined as an elevated, high temperature is generally the temperature used in sterilization or pasteurization or autoclaving (retorting) processes to complete the sterilization or pasteurization or autoclaving processes Said specific temperature, generally defined as an elevated, high, temperature, is generally above 100° C. or equal to 100° C., and may range from 100° C. to 140° C., preferably from 116° C. to 134° C. or 135° C., more preferably from 120° C. to 132° C., still preferably from 121° C. to 127° C.

The period of time is generally the period of time used in sterilization or pasteurization or autoclaving processes to complete the sterilization or pasteurization or autoclaving processes.

Said period of time is generally above 10 minutes or equal to 10 minutes and may range from 10 minutes to 2 hours, preferably from 15 minutes to 2 hours, more preferably from 15 minutes to 30 minutes, still preferably from 20 minutes to 30 minutes.

The water and/or steam conditions are generally defined by pressure and/or concentration and/or humidity level. Said conditions are generally the water and/or steam conditions used in sterilization or pasteurization or autoclaving processes to complete the sterilization or pasteurization or autoclaving processes.

Said water and/or steam conditions are well-known from the man skilled in the art in this technical field.

Said conditions may be, for example as follows:

Saturated steam (i.e. this is the condition as regards humidity, moisture, level).

Pressure equal to 1 bar or slightly higher than 1 bar, for example up to 2 bars.

The conditions used in sterilization or pasteurization or autoclaving processes depend on the species to be sterilized and on the volume of the package.

For example chestnuts require more time than green beans to be sterilized.

For example, sterilization of a package having a volume of 10 liters requires more time than sterilization of a package having a volume of 1 liter.

The above colour change can be defined as permanent or irreversible because the colour of the heat resistant, and water or steam resistant pigment cannot be changed any longer for example under the influence of heat and/or steam or water and because the dye chemically decomposes.

The ink composition according to the invention has never been described, nor suggested in the prior art, as represented e.g. by EP-A1-0289141.

According to a fundamental characteristic, the ink composition according to the invention comprises a combination of specific colorants which has never been described nor suggested in the prior art.

In particular, the ink composition according to the invention comprises the specific combination of a heat resistant, and water or steam resistant pigment and of a specific heat sensitive, and water or steam sensitive, dye, which has never been described nor suggested in the prior art.

The ink compositions of EP-A1-0289141 comprises the combination of two dyes and not the combination of a pigment and a dye.

Moreover, the heat sensitive, and water or steam sensitive dye of the ink composition according to the invention is preferably a specific dye, namely a metal complex dye.

Finally, said pigment and said dye are specifically selected so that the colours of the pigment and the colour of the dye are complementary in the colour spectrum meaning that the colour of the ink composition or of a marking obtained using said ink composition is generally black or substantially black.

Such a specific combination of pigment and dye has never been described nor suggested in the prior art.

The ink composition according to the invention inter alia meets the needs, criteria and requirements mentioned above, and provides a solution to the problems of the thermochromic ink jet compositions of the prior art such as the ink composition of EP-A1-0289141, and does have the drawbacks, limitations, defects and disadvantages of the thermochromic ink compositions of the prior art.

Because the colorant which is heat resistant, and water or steam resistant is a pigment and not a dye the colour of said pigment, as already mentioned above, cannot be changed any longer for example under the influence of heat and/or steam or water. Said colour change can be defined as permanent or irreversible because chemical decomposition of the dye occurs and is clear, non-ambiguous, and can be readily and clearly identified.

The ink composition of the invention thus provides a positive and visible indication that the process such as a sterilization or pasteurization or autoclaving (retorting) has been actually and properly carried out on the object such as a package to which the ink composition is applied.

The colour of the pigment and the colour of the dye are complementary in the colour spectrum, leading to achromatic colour before sterilization (black or a colour close to black) and a chromatic one after sterilization (modified $L^*a^*b^*$ and $\Delta E>15$ enabling to well follow sterilization process efficiency).

The colour (colorimetric) space that is used is the CIE 1976 $L^*a^*b^*$ colour space, system, as defined by the International Commission on Illumination (Commission Internationale de l'Eclairage (CIE)).

In particular, the markings obtained when using the ink jet compositions according to the invention resist to friction, rubbing, before and after autoclaving, pasteurization, sterilization (see examples). The markings are not damaged of erased before and after autoclaving, pasteurization, or sterilization (see examples).

The printing quality is high before and after, autoclaving, pasteurization, or sterilization, the markings visually appear as distinct, well separated, round dots (or droplets), which do not merge with each other and the printed message is clear and easily legible (see examples).

In other words, the marking dots exhibit a high definition and do not smear or smudge before and after, autoclaving, pasteurization, or sterilization.

The markings obtained with the thermochromic ink jet ink compositions according to the invention are also highly resistant to organic solvents, alcohols, oils, and greasy substrates, and to rubbing with said substances before and after having been submitted to heat and water or steam, e.g. before and after sterilization, pasteurization or autoclaving.

The ink compositions according to the invention are also stable upon storage even during long period of time, generally of at least 9 months, between 0° C. and 50° C.

The man skilled in the art can easily determine which pigments are heat resistant, and water or steam resistant. In particular, the man skilled in the art can easily determine which pigments are resistant to the elevated temperatures, and to water or steam during the time period specified above.

The man skilled in the art can easily determine which dyes are heat sensitive, and water or steam sensitive. In particular, the man skilled in the art can easily determine which dyes are sensitive to the elevated temperatures, and to water or steam during the time period specified above.

Advantageously, the heat resistant, and water or steam resistant pigment is chosen from among Colour Index (C.I.) pigments, in other words pigments defined according to their colour index as C.I. pigments.

Advantageously, the heat sensitive, and water or steam sensitive dye is chosen from among Colour Index (C.I) solvent dyes, such as metal complex dyes. Such dyes dissolve well in the organic solvents of the ink and thus gives a clear color change of the ink or marking.

The term "metal complex dye" refers to a compound in which one or more dye molecules are coordinated with a metal ion. The dye molecule can be any dye containing one or more functional groups such as hydroxy, carboxy, sulfonate or amino, which are capable of forming a coordination complex with the metal ion. The metal ion may be for example any transition metal ion such as a copper, nickel or copper metal ion.

Advantageously, the colour of the heat resistant, and water or steam resistant pigment is blue or green or red and the colour of the heat sensitive, and water or steam sensitive, dye is red or blue.

The colour of the heat resistant, and water or steam resistant pigment and the colour of the heat sensitive, and water or steam sensitive, dye are generally different.

Preferably, the heat resistant, and water or steam resistant pigment is chosen from among Pigment Blue 60 and Pigment Blue 15:3.

Preferably, the heat sensitive, and water or steam sensitive, dye is Solvent red 160.

Advantageously, the ink composition according to the invention comprises from 0.5 to 15%, preferably from 1 to 10%, still preferably from 1 to 5% by weight of the heat resistant, and water or steam resistant pigment.

Advantageously, the ink composition according to the invention, comprises from 0.5 to 15%, preferably from 1 to 10%, still preferably from 1 to 5% by weight of the heat sensitive, and water or steam sensitive, dye.

Advantageously, the binding resin(s) may be selected from (meth)acrylic, vinylic, ketonic, hydroxyaromatic for example phenolic, cellulosic, styrenic, epoxy, polyurethane, styrene-acrylate, alkoxysilane, ester resins, and combinations thereof.

Preferably, the binding resin(s) is(are) selected from cellulosic, polyurethane, vinylic, phenolic, resins and the combinations of two or more of the latter.

Preferably, the binding resin(s) is(are) selected from vinyl acetate/vinyl chloride copolymers, phenolic resins, cellulosic resins and combinations thereof which gives the bests results in terms of adhesion to the substrate, printing definition, quality of markings, and rubbing resistance.

More preferably, the binding resin(s) is(are) selected from vinyl acetate/vinyl chloride copolymers which gives even better results in terms of adhesion to the substrate, printing definition, quality of markings, and rubbing resistance.

Specific examples of these resins include those sold under the trade name of Vinnol® from Wacker Chemie®. These resins include structurally modified carboxyl-vinyl chloride/vinyl acetate polymers such as Vinnol® E15/45M, hydroxyl-modified vinyl chloride/vinyl acetate polymers such as Vinnol® E15/40A or unmodified vinyl chloride/vinyl acetate polymers such as Vinnol® H14/36/Vinnol® H14/36 TF.

Advantageously, the binder represents from 0.1 to 50% by weight, preferably from 1% to 45% by weight, still preferably from 5% to 30% by weight, better from 10% to 20% by weight, of the total weight of the ink composition according to the invention.

The ink composition according to the invention may be generally a non-aqueous composition, which generally means that the ink composition according to the invention contains a very low proportion of water.

Thus, the ink composition according to the invention usually comprises less than 0.5% by weight of water, preferably less than 0.1% by weight of water and even more preferably less than 0.05% by weight of water in proportion to the total weight of the ink; even better, the solvent, and the ink composition may be considered to essentially contain no water (0% by weight of water).

Since the added water is an impurity in the various components of the ink, the water content will be low when the degree of purity of the components is high. In fact, it could be said that the ink according to the invention does not contain any added water but only water included as an impurity in the different constituents of the ink.

Similarly, the solvent of the ink composition according to the invention is usually non-aqueous in the sense described above, in other words this solvent is essentially or exclusively organic and only comprises organic solvent compounds.

In the composition according to the invention, the solvent generally represents 20% to 99% by weight of the total weight of the ink composition, preferably the solvent represents from 30% to 95% by weight, more preferably 30% to 90% by weight, even more preferably from 60% to 80% by weight, of the total weight of the ink composition according to the invention.

The solvent comprises, preferably consists of, one or several organic solvent compound(s).

Advantageously, said organic solvent compound(s) comprise(s) a majority weight proportion, based on the total weight of the solvent (50% by weight of the total weight of the solvent or more, or even up to 100% by weight of the total weight of the solvent), of one or several volatile organic solvent compound(s), and a minority weight proportion, based on the total weight of the solvent, of one or several non-volatile organic solvent compound(s).

Preferably, the solvent consists of one or several volatile organic solvent compound(s).

By «volatile organic solvent compound» is generally meant that this compound has a speed of evaporation, evaporation rate, of more than 0.5 (preferably of more than 1.5, more preferably of more than 2) on the scale in which n-butyl acetate has a speed of evaporation equal to 1. In other words (see below), this organic solvent compound has a volatility index according to NF T30-301 standard of more than 0.5, preferably of more than 1.5, more preferably of more than 2.

Said organic solvent compound(s) being part of the solvent is(are) selected, for example from alcohols, in particular low molecular weight alcohols, for example aliphatic alcohols such as ethanol; ketones preferably with a low molecular weight; ethers of alkylene glycols; esters of alkylene glycols and esters of alkylene glycols ethers, such as acetates; dimethyl formamide; N-methyl pyrrolidone; acetals; esters; linear or cyclic ethers; aliphatic, cyclic or linear hydrocarbons; aromatic hydrocarbons; and carbonates such as propylene carbonate, ethylene carbonate and dimethyl- and diethyl-carbonates; and mixtures thereof.

Preferably, this or these solvent compound(s) has(have) the property of dissolving the other ingredients of the ink, notably the binder, the coloring materials, the additives, etc.

The alcohols will preferably be selected from linear or branched aliphatic alcohols with 1 to 8 carbon atoms, such as methanol, ethanol, propanol-1, propanol-2, n-butanol, butanol-2, tert-butanol, etc.

The ketones will preferably be selected from ketones with 3 to 10 carbon atoms, such as acetone, butanone (methylethyl-ketone), pentanone-2 (methyl-propyl-ketone), pentanone-3 (diethyl ketone), methyl-3 butanone-2 (methylisopropyl-ketone) and methyl-4 pentanone-2 (methylisobutyl-ketone).

The ethers of alkylene glycols are preferably selected from mono-alkyl ethers ($C_1$-$C_6$ alkyl group) or dialkyl ethers ($C_1$-$C_6$ alkyl groups) of alkylene glycol comprising from 1 to 10 carbon atoms in the alkylene chain, preferably these are ethers of ethylene or propylene glycol, such as methoxypropanol.

The esters of alkylene glycols and the esters of alkylene glycol ethers are preferably selected from among the esters of those with saturated aliphatic carboxylic acids with 1 to 6 carbon atoms, such as formic acid, acetic acid, propionic acid, butyric acid, valeric acid and caproic acid.

Mention may for example be made of methoxypropyl acetate, butyldiglycol acetate, etc.

The esters are preferably selected from low molecular mass esters such as formates, acetates, propionates or butyrates of alcohols with 1 to 10 carbon atoms.

The acetals are preferably selected from low molecular mass acetals such as ethylal and methylal.

The ethers are preferably selected from among low molecular mass ethers like dioxolane or tetrahydrofurane.

The man skilled in the art may easily identify from among these solvent compounds those which are volatile and those which are not volatile.

A preferred solvent according to the invention comprises a majority amount by weight (50% or more by weight) based on the total weight of the solvent, of one or several solvent compound(s) selected from ketones with 3 to 10 carbon atoms, such as acetone, butanone (methyl-ethyl-ketone or MEK), pentanone-2 (methyl-propyl-ketone or "MPK"), pentanone-3 (diethyl ketone), methyl-3 butanone-2 (methyl-isopropyl-ketone or "MiPK") and methyl-4 pentanone-2 (methyl-isobutyl-ketone or MIK).

A more preferred solvent according to the invention consists of one or several solvent compound(s) selected from ketones with 3 to 10 carbon atoms, such as acetone, butanone (methyl-ethyl-ketone or MEK), pentanone-2 (methyl-propyl-ketone), pentanone-3 (diethyl ketone), methyl-3 butanone-2 (methyl-isopropyl-ketone) and methyl-4 pentanone-2 (methyl-isobutyl-ketone or MIK).

A particularly preferred solvent comprises a majority amount by weight based on the total weight of the solvent, of MEK; preferably, said preferred solvent consists of MEK.

Another preferred solvent comprises a majority amount by weight based on the total weight of the solvent of one or more volatile C5 ketone solvents, such as pentanone-2 (methyl-propyl-ketone), pentanone-3 (diethyl ketone), and methyl-3 butanone-2 (methyl-isopropyl-ketone). Preferably, said other preferred solvent consists of one or more volatile C5 ketone solvents, such as pentanone-2 (methyl-propyl-ketone), pentanone-3 (diethyl ketone), and methyl-3 butanone-2 (methyl-isopropyl-ketone).

These preferred solvents may further comprise one or several other solvent compounds, other than the ketone(s), in a total minority amount by weight, based on the total weight of the solvent, for example in an amount from 0.1% to 20% by weight, preferably from 5% to 15% by weight, based on the total weight of the solvent, in order to optimize the properties of the inks. These minority solvents may be selected from esters, ethers of ethylene glycol or of propylene glycol, and from acetals.

Generally, the solvent of the ink composition according to the invention (or more precisely the one or more organic solvent(s) liquid at ambient temperature of said solvent) has a volatility index (Ve) of evaporation index according to NF T30-301 standard (relative to n-butyl acetate) of more than 0.5, preferably of more than 1.5, and more preferably of more than 2.

MEK has a Ve of 3.7 and ethanol has a Ve of 2.

NF T30-301 standard defines the volatility (or evaporation) index of a solvent as follows:

The volatility index (Ve) is the quotient of the evaporation time of n-butyl acetate taken as standard solvent, divided by the evaporation time of the tested solvent, said times being measured under the conditions set out in said NF T30-301 standard.

Thus, $$Ve \text{ (relative to } n\text{-butyl acetate)} = \frac{\text{evaporation time of } n\text{-butyl acetate}}{\text{evaporation time of the tested solvent}}.$$

The solvent compounds of ink compositions used in the DOD printing technique are generally those with Ve<1.

The ink composition may further comprise one or several plasticizers (of the binding resin(s)) for example selected from plasticizers known to the man skilled in the art and selected according to the binder used comprising one or several binding resin(s).

The plasticizer may be selected from all the plasticizers known to the man skilled in the art. The plasticizer is selected according to the binder used comprising one or several binding resin(s). The plasticizer is generally different from the binding resin(s).

Mention may be made, as a plasticizer, for example, of thermoplastic polyurethanes, phthalates, adipates, esters such as citrates like triakyl citrates, for example tributy citrate, alkyl phosphates, glycerol, lactic acid, oleic acid, polypropylene glycol, triglycerides of fatty acids, levulinic acid; carbamates or carbamic resins; and mixtures thereof.

By "thermoplastic polyurethanes" are meant polyurethanes from the polycondensation of polyalcohols and of polyisocyanates.

The plasticizer(s) is (are) generally present in an amount of at least 0.05%, preferably 0.1 to 20% by weight, of the total weight of the ink composition.

The composition according to the invention, if it is required to be jettabe, sprayabe, using the deflected continuous jet printing technique, may also optionally comprise at least one conductivity salt, unless another ingredient of the ink such as a dye, pigment or other, is itself an ionisable compound such as a salt that can confer conductivity when it is dissociated, and gives sufficient conductivity to the ink so that there is no need to add another conductivity salt strictly speaking.

When the ink according to the invention has to be applicable by a deflected continuous ink jet, it must have sufficient electrical conductivity, generally greater than or equal to 5 µS/cm at 20° C., preferably greater than or equal to 300 µS/cm at 20° C., even more preferably greater than or equal to 500 µS/cm at 20° C.

The conductivity of the ink composition according to the invention using the deflected continuous jet printing technique could for example be between 300 and 5000 µS/cm at 20° C., particularly between 500 and 2 000 µS/cm at 20° C.

Let us specify that the electric conductivity is measured with a commercial instrument and according to the principle well-known to the man skilled in the art, for example described on the site: http://fr.wikipedia.org/wiki/Conductim%C3%A9trie.

The electric conductivity may be measured according to the following standard:

ASTM D1125-14: Standard Test Methods for Electrical Conductivity and Resistivity of Water.

The electric conductivity may be measured for example with a commercially available conductimeter of the Radiometer® Company.

However, it will sometimes be necessary to include at least one conductivity salt strictly speaking into the ink composition, different from ionisable compounds, such as the dyes, pigments and other ingredients mentioned above.

A "conductivity salt" generally means a salt that confers electrical conductivity to the ink composition.

This conductivity salt may thus be chosen from among alkaline metals salts such as lithium, sodium, potassium salts, alkaline earth metal salts such as magnesium and calcium salts, and single or quaternary ammonium salts; these salts being in the form of halides (chlorides, bromides, iodides, fluorides), perchlorates, nitrates, thiocyanates, formiates, acetates, sulphates, propionates, trifluoroacetates, triflates (trifluoromethane sulphonates), hexafluorophosphates, hexafluoroantimonates, tetrafluoroborates, picrates, carboxylates or sulphonates, etc.

Since the markings obtained with the ink composition usually have to be resistant to water, this or these conductivity salts will preferably be chosen from among those that are insoluble in water (in other words, in general, for which the solubility in water is less than 0.5% by weight), such as fatty chain quaternary ammonium and hexafluorophosphates or hexafluroantimonates.

Therefore, this at least one conductivity salt will be present if necessary in the ink composition so as to confer the above conductivity to the ink. Preferably, its (their) amount will be from 0.1 to 20% by weight, more preferably from 0.1 to 10% by weight and even better from 0.1 to 5% by weight, of the total weight of the ink composition.

The composition according to the invention may also comprise one or several additives, for example chosen from among the compounds that improve the solubility of some of its components, the print quality, the adherence, or the control of wetting of the ink on different supports.

The additive(s) may be chosen for example from among anti-foaming agents; chemical stabilisers; UV stabilisers; surface active agents such as Fluorad® FC430 or BYK UV-3500® or polyether modified polysiloxanes; agents inhibiting corrosion by salts, particularly by conductivity salts; bactericides, fungicides and biocides; and pH regulatory buffers, etc.

The additive(s) is (are) used at very low doses, usually less than or equal to 5% and sometimes as low as 0.01%, depending on whether they are anti-foaming agents, stabilisers or surface-active agents.

The viscosity of the ink jet ink composition according to the invention is generally from 1 to 20 cPs (mPa·s), preferably from 1 to 15 cPs, still preferably from 1 to 10 cPs (mPa·s) at 20° C.

The viscosity may be measured according to the following standard:

DIN 53019-1: Measurements of viscosities and flow curves by means of rotational viscometers.

The dynamic viscosities may be measured for example by means of a viscometer with coaxial cylinders, such as the viscometer with coaxial cylinders of the "Couette" type of the Contraves® Company.

Another object of the invention is a method for marking a substrate, support or object, article, for example, porous or non-porous, by spraying an ink onto this substrate, support or object, article using an ink jet printing technique, the sprayed ink being an ink composition according to the invention as described above.

Marking may be made using the continuous deflected ink jet printing technique or the drop on demand ink jet printing technique. The continuous deflected ink jet printing technique also includes the continuous deflected ink jet printing technique, with uncharged drops called the "SPI" technique.

Another object of the invention is a substrate, support or object, article, for example porous or non-porous provided with a marking obtained by drying and/or absorption (in the substrate or support or object or article) of the ink composition as described above.

Said marking comprises essentially the dye or pigment of the ink and the binder and is obtained by evaporation and/or absorption in the substrate, of essentially all other constituents of the ink such as the solvent.

The substrate, support or object, article is whatever substrates on which one can print using an ink jet printing technique such as the CIJ printing technique.

This substrate, support or object, article may be made of a metal, for example of iron, aluminium; of an alloy, for example of steel, especially of stainless steel (cans such as beverage cans); of glass (glass bottles); of ceramic; of a material containing cellulose such as cellophane, paper, possibly coated or glazed, cardboard or wood; of an organic polymer, particularly of a thermoplastic polymer (plastic), particularly in the form of a film, for example chosen from among PVDC, PVC, polyesters, PET, polyolefins, such as polyethylenes (PE), polypropylenes (PP); made of poly (methyl methacrylate) PMMA also called "Plexiglas"; of fabric; of natural or synthetic rubber; or of any other non-porous or porous substance; or of a composite of several of the above materials.

The substrate may be a package for food (including pet food) products, pharmaceutical products, medical products or surgical products. The substrate may have any shape.

The substrate is generally a substrate that should undergo sterilization, pasteurization or autoclaving (retorting).

An excellent quality of markings, printings can be obtained on all substrates, particularly on flexible or very flexible substrates and even on greasy, oily or "creamy" surfaces, with no transfer, no spreading, no smearing, and very sharp markings, resistant to friction for example with an oily cloth, and to water and solvents.

Another object of the invention is a method of indicating sterilization or pasteurization or autoclaving (retorting) of a substrate, support or object, article, which comprises the following successive steps:

a) Marking said substrate, support or object, article, by the method disclosed above, namely by spraying an ink on said substrate, support or object, article using an ink jet printing technique, the sprayed ink being an ink composition according to the invention as described above, whereby a marked substrate, support or object, article having a marking on at least one surface is obtained;

b) Exposing the marked substrate, support, or object, article to both an elevated, high temperature and steam or water during a period of time so that the colour of the marking printed using said ink composition changes to the colour of the heat resistant, and water or steam resistant pigment;

said elevated, high temperature being the temperature used in sterilization or pasteurization or autoclaving processes to complete the sterilization or pasteurization or autoclaving processes, and said period of time being the period of time used in sterilization or pasteurization or autoclaving process to complete the sterilization or pasteurization or autoclaving processes.

The method of indicating sterilization or pasteurization or autoclaving (retorting) of a substrate, support or object, article, according to the invention, actually provides a reliable, positive and visible indication that sterilization or pasteurization or autoclaving has been actually, properly carried out at the end of said period of time.

The elevated, high temperature has already been defined above.

Said elevated temperature is generally above 100° C. or equal to 100° C., and may range from 100° C. to 140° C., preferably from 116° C. to 134° C. or 135° C., more preferably from 120° C. to 132° C., still preferably from 121° C. to 127° C.

The period of time has already been defined above.

Said period of time is generally above 10 minutes or equal to 10 minutes and may range from 10 minutes to 2 hours, preferably from 15 minutes to 2 hours, more preferably from 15 minutes to 30 minutes, still preferably from 20 minutes to 30 minutes.

The water and/or steam conditions used in step b) are generally defined by pressure and/or concentration and/or humidity level.

Said conditions used in step b) are the water and/or steam conditions used in sterilization or pasteurization or autoclaving processes to complete the sterilization or pasteurization or autoclaving processes.

Said water and/or steam conditions used in step b) are well known from the man skilled in the art in this technical field and have already been fully disclosed above.

Sterilization or pasteurization or autoclaving is generally carried out between 10 min and 24 h, for example one hour, after marking.

The substrate is generally as already defined above.

DETAILED DESCRIPTION OF PARTICULAR EMBODIMENTS

The invention will be better understood upon reading the following description of embodiments of the invention, given as illustrative and non-limiting examples.

Examples

In all these examples, thermochromic ink compositions according to the invention are prepared.

These ink compositions comprise, the ingredients, constituents, mentioned in Table I, in the proportions mentioned in Table I.

These compositions are generally prepared by simply mixing the ingredients.

The binder percentages are given as wt. % solid, and the pigment percentages are given as wt. % solid.

The Viscosity at 20° C. (mPa·s/cPs), the conductivity at 20° C. (μS/cm), the colour of the ink compositions (before sterilization), the L*a*b*, the Colour change after sterilization, and the Delta E (ΔE) have also been specified in Table I.

TABLE I

| INK COMPOSITIONS | | |
| --- | --- | --- |
| Constituents (% by weight) | Example 1 | Example 2 |
| Methyl-Ethyl- Ketone (MEK) | 82.85 | 82.85 |
| Copolymer of vinyl chloride and vinyl acetate (Vinnol ® H14/36TF | 9.5 | 9.5 |
| Tetrabutyl ammonium hexafluorophosphate | 1.2 | 1.2 |
| Polyether modified polysiloxane | 0.1 | 0.1 |
| Pigment blue 60 (50% dispersion in vinyl resin) | 4.5 | |
| Pigment blue 15:3 (50% dispersion vinyl resin) | | 4.5 |
| Solvent red 160 | 1.85 | 1.85 |
| Viscosity at 20° C. (mPa · s/cPs) | 5.1 | 5.1 |
| Conductivity at 20° C. (μS/cm) | 850 | 850 |
| Colour | black | black |
| L*a*b* | See below | See below |
| Colour change after sterilization | from black to blue | from black to blue |
| Delta E | >15 | >15 |

Let us specify that the weight percentage of the dispersion of pigment(s) is expressed as a weight percentage of solid pigment based on the total weight of the ink composition and not on the percentage of liquid dispersion, the concentration of which may vary.

The dynamic viscosities have been measured by means of a viscometer with coaxial cylinders namely a Brookfield LVT viscometer, at a shearing rate of the order of 60 s$^{-1}$ or a viscometer of the "Couette" type of the Contraves® Company.

The electric conductivities have been measured with a commercially available conductimeter of the Radiometer® Company.

The ink compositions according to the invention of examples 1 and 2, were sprayed, using Markem-Imaje® printers 9450 and 9040, which use the continuous deflected ink jet printing technique (but other printers may be used) on PET, aluminium, steel, stainless steel, iron or other metals, and Polypropylene substrates shaped as foils, cans, or bottles.

L*, a*, and b* were measured by means of an eXact® spectrophotometer of the Xrite® company with a M3 filter, i.e. reflectance being measured with an illuminent A having a crossed polarization excluding UV component (previously polarized filter).

ΔE was calculated according to CIE-1976.

On the same PET, aluminium, steel, stainless steel, iron or other metals, and Polypropylene substrates, a Markem-Imaje® thermochromic Ink referenced 5595 (MI 5595) available on the market, was also sprayed using the same Markem-Imaje® printers, i.e. 9450 and 9040, and the same printing parameters, but other printers may be used. Said ink is used as a control ink or comparative ink because it is currently commonly used as a thermochromic ink for marking substrates to be sterilized.

Comparative ink MI 5595 is not an ink according to the invention.

One hour after having been marked the marked substrates are then steam sterilized at 121° C. for 30 minutes.

The properties of the markings are summarized in Table II below.

TABLE II

|  | Example 1 | Example 2 | Comparative Example: Ink 5595 |
|---|---|---|---|
| Dry Rubbing with a finger, 10 back and forth movements. Before sterilization. | OK (Marking unchanged, not damaged or erased) | OK (Marking unchanged, not damaged or erased) | OK (Marking unchanged, not damaged or erased) |
| Color before and after Sterilization | Black to blue | Black to blue | black to red |
| Dry Rubbing with a finger, 10 back and forth movements. After sterilization. | OK (Marking unchanged, not damaged or erased) | OK (Marking unchanged, not damaged or erased) | OK but sometimes premature colour change |
| Printing quality after sterilization. | OK (visually: round dots, well separated) | OK (visually: round dots, well separated) | Spread marking: poor definition of the dots - dots are merging making the message hardly readable |

The colour changes observed with the inventive inks of Examples 1 and 2 are quite similar. L*, a*, b* of the black marking (marking before sterilization): $L^*<8//-1<a^*<-0.5//-10<b^*<0.6$.

L*, a*, b* of the blue marking (marking after sterilization): $L^*<8//-15<a^*<-10//-16<b^*<-10$.

Delta E (ΔE)>15.

Other tests were carried out using the following procedure.

The ink composition according to the invention, of example 1, was sprayed, using a Markem-Imaje® printer 9450 or 9040 on the same white part of a PET substrate (pouch).

Using the same procedure, a comparative ink composition was sprayed, using Markem-Imaje® printers 9450 and 9040 on the same white part of a PET substrate.

Said comparative ink is a Markem-Imaje® thermochromic Ink referenced 5595 (MI 5595) available on the market.

Said ink is used as control ink or comparative ink because it is currently commonly used as a thermochromic ink for marking substrates to be sterilized.

Comparative ink MI 5595 is not an ink according to the invention.

One hour after having been marked the marked substrates are then steam sterilized at 121° C. for 30 minutes.

The properties of the markings (L*, a*, b*) before and after sterilization are summarized in Table III below.

L*, a*, and b* were measured by means of an eXact® spectrophotometer of the Xrite® company with a M3 filter, i.e. reflectance being measured with an illuminent A having a crossed polarization excluding UV component (previously polarized filter).

ΔE was calculated according to CIE-1976.

TABLE III

|  |  | L* | a* | b* | ΔE (Before and after Sterilization) |
|---|---|---|---|---|---|
| Example 1 according to the invention | | | | | |
| Before Sterilization | | | | | |
| CIE L*a*b* | Measurement 1 | 5.1244 | 19.2506 | −35.7718 | |
| CIE L*a*b* | Measurement 2 | 5.1876 | 19.3692 | −35.7667 | |
| CIE L*a*b* | Measurement 3 | 4.7651 | 18.7451 | −35.2848 | |
| CIE L*a*b* | Average of the above measurements | 5.0257 | 19.1216333 | −35.6077667 | |
| After Sterilization | | | | | |
| CIE L*a*b* | Measurement 1 | 18.2399 | 12.6445 | −49.6324 | 20.33 |
| CIE L*a*b* | Measurement 2 | 18.1788 | 12.2379 | −48.931 | 19.95 |
| CIE L*a*b* | Measurement 3 | 16.8458 | 15.5115 | −50.624 | 19.45 |
| | Average of the above measurements | 17.7548 | 13.4646 | −49.7291 | 19.91 |
| Comparative example (MI 5595) | | | | | |
| Before Sterilization | | | | | |
| CIE L*a*b* | Measurement 1 | 13.3518 | 38.314 | 19.374 | |
| CIE L*a*b* | Measurement 2 | 13.9121 | 38.4673 | 19.5809 | |
| CIE L*a*b* | Measurement 3 | 10.9368 | 36.1164 | 16.6288 | |
| CIE L*a*b* | Average of the above measurements | 12.7335 | 37.6325 | 18.5279 | |
| After Sterilization | | | | | |
| CIE L*a*b* | Measurement 1 | 22.0826 | 40.7532 | 16.1508 | 10.14 |
| CIE L*a*b* | Measurement 2 | 20.5899 | 40.1068 | 16.4116 | 8.5 |
| CIE L*a*b* | Measurement 3 | 21.3666 | 40.449 | 16.4649 | 9.31 |
| | Average of the above measurements | 21.34637 | 40.43633 | 16.34243 | 9.32 |

The ink from example 1 according to the invention shows ΔE>15 corresponding to no questionable colour change.

Still other tests were carried out using the following procedure.

The ink composition according to the invention, of example 1, was sprayed, using a Markem-Imaje® printer 9450 or 9040 on PET and aluminium substrates.

The PET substrates are shiny white or orange pouches. The PET and the aluminium substrates have or have not a punching oil residue on their surfaces.

Using the same procedure comparative ink compositions were sprayed, using a Markem-Imaje® printer 9450 or 9040 on the white part of a PET substrate.

Said comparative inks are a Markem-Imaje® thermochromic Ink referenced 5590 (MI 5590), a Markem-Imaje® thermochromic Ink referenced 5595 (MI 5595) available on the market, a Markem-Imaje® thermochromic Ink referenced 9560 (MI 9560) available on the market, a Videojet® thermochromic ink referenced V4274L available on the market, and a Videojet® thermochromic ink referenced V4275L available on the market.

Said inks are used as control inks or comparative inks because they are currently commonly used as a thermochromic ink for marking substrates to be sterilized.

Said comparative inks are not inks according to the invention.

One hour after having been marked, the marked substrates are then steam sterilized at 121° C. for 30 minutes.

The properties of the markings before and after sterilization are summarized in Table IV below.

It is shown from Tables III and IV that the ink from example 1 shows:

Superior black colour strength before sterilization
Very clear colour change after sterilization
Higher printing quality
Higher reliability (100%) in colour change with sterilization process
No transfer.

TABLE IV

| Inks | Substrates | Drying time | Printing quality | Dry Rubbing with a finger, 10 back and forth movements. Before sterilization. | Rubbing with a finger on oil, 10 back and forth movements. Before sterilization | Colour | Sterilization 121° C./30 min |
|---|---|---|---|---|---|---|---|
| Example 1 according to the invention | Coloured PET | 1 sec | Good, even on oily substrates | Good | Good | Bluish black | yes |
| | White PET | 1 sec | Good, even on oily substrates | Good | Good | Bluish black | yes |
| | Aluminium | 1 sec | Good, even on oily substrates | Good | Good | Bluish black | yes |
| V4274L (black to blue) | Coloured PET | 5 sec | Good but spread a lot on oily substrates | Good | Good | black | yes |
| | White PET | 5 sec | Good but spread a lot on oily substrates | Good | Good | black | yes |
| | Aluminium | 5 sec | Good but spread a lot on oily substrates | Good | Good | Greenish black | yes |
| V4275L (black to blue) | Coloured PET | 4 sec | Good but spread a lot with or without oiiy substrates | Good | Good | Greenish grey | yes |
| | White PET | 4sec | Good but spread a lot with or without oily substrates | Good | Good | Greenish grey | yes |
| | Aluminium | 4 sec | Good but spread a lot with or without oily substrates | Good | Good | Greenish blue | yes |
| 5590 (black to blue) | Coloured PET | 5 sec | Good but spread a lot on oily substrates | Good | Good | Greenish grey | yes |
| | White PET | 5 sec | Good but spread a lot on oily substrates | Good | Good | Greenish grey | yes |
| | Aluminium | 5 sec | Good but spread a lot on oily substrates | Good | Bonne | Greenish blue | yes |
| 5595 (black to red) | Coloured PET | 5 sec | Good but spread a lot on oily substrates | Good | Partial disappearance | Red from the start | yes |
| | White PET | 5 sec | Good but spread a lot on oily substrates | Good | Partial disappearance | Red from the start | yes |
| | Aluminium | 5 sec | Good but spread a lot on oily substrates | Good | Partial disappearance | Red from the start | yes |

TABLE IV-continued

| | | | | | | | |
|---|---|---|---|---|---|---|---|
| 9560 (black to blue) | Coloured PET | 5 sec | Good but spread a bit on oily substrates | Good | Partial disappearance | black | yes |
| | White PET | 5 sec | Good but spread a bit on oily substrates | Good | Partial disappearance | black | yes |
| | Aluminium | 5 sec | Good but spread a bit on oily substrates | Good | Partial disappearance | black | yes |

| Inks | Colour Change | Dry Rubbing with a finger, 10 back and forth movements. After sterilization | Printing quality | Transfer |
|---|---|---|---|---|
| Example 1 according to the invention | Yes- to blue | Good | Good | No transfer |
| | Yes- to blue | Good | Good | |
| | Yes-to blue | Good | Good | Not tested |
| V4274L (black to blue) | Not clear | Good | Good but spread a lot on oil | transfer |
| | Not clear | Good | Good but spread a lot on oil | |
| | Not clear | Good | Good but spread a lot on oil | Not tested |
| V4275L (black to blue) | Not clear | Good | Spread a lot | transfer |
| | Not clear | Good | Spread a lot | |
| | Not clear-just more intense blue | Good | Spread a lot | Not tested |
| 5590 (black to blue) | Yes- to blue | Good | Good but spread a lot on oil | transfer |
| | Yes- to blue | Good | Good but spread a lot on oil | |
| | Yes-to blue | Good | Good but spread a lot on oil | Not tested |
| 5595 (black to red) | No - Colour change before sterilization | Good | Good but spread a lot on oil | transfer |
| | No - Colour change before sterilization | Good | Good but spread a lot on oil | |
| | No - Colour change before sterilization | Good | Good but spread a lot on oil | Not tested |
| 9560 (black to blue) | No clear colour change | Good | Good | transfer |
| | No clear colour change | Good | Good | |
| | No clear colour change | Good | Good | Not tested |

Transfer was assessed as follows: Substrates were stacked and in contact during sterilization process. Transfer occurred if ink was transferred from the in contact surface of one substrate to the in contact surface of the other(s) substrate(s).

Table IV shows that the performances of the inventive ink of Example 1 are superior to the performances of comparative inks.

The ink according to the invention of Example 1:
Exhibits 100% reliability in color change with sterilization process.
Gives High Impression quality.
Shows no transfer from one substrate to the other.
Exhibits Oil fastness(less smudging on oily substrates),
Clear color change always occurs after sterilization.

The invention claimed is:

1. A thermochromic ink composition for ink jet printing, liquid at room temperature, comprising:
    a) a solvent comprising one or several organic solvent compound(s);
    b) a binder, comprising at least one binding resin;
    c) a heat resistant, and water or steam resistant pigment which does not undergo any structural change upon exposure to a temperature of between 100 and 140° C. in the presence of water or steam during a period of between 10 minutes to 2 hours;
    d) a heat sensitive, and water or steam sensitive, dye which is capable of undergoing decomposition upon exposure to a temperature of between 100 and 140° C. in the presence of water or steam during a period of between 10 minutes to 2 hours;
    wherein the pigment and the dye are selected so that:
        the colour of the pigment and the colour of the dye are complementary in the colour spectrum,
        the colour of the ink composition or of a marking printed using said ink composition changes to the colour of the heat resistant, and water or steam resistant pigment upon exposure to a temperature of between 100 and 140° C. in the presence of water or steam during a period of between 10 minutes to 2 hours, and
    wherein the binder is substantially free of hydroxyaromatic binding resins, ketonic binding resins, and polyester binding resins.

2. The ink composition according to claim 1, wherein the heat resistant, and water or steam resistant pigment is chosen from among Colour Index (C.I.) pigments.

3. The ink composition according to claim 1, wherein the heat sensitive, and water or steam sensitive dye is chosen from among Colour Index (C.I.) solvent dyes.

4. The ink composition according to claim 1, wherein the colour of the heat resistant, and water or steam resistant pigment is blue or green or red and the colour of the heat sensitive, and water or steam sensitive, dye is red or blue.

5. The ink composition according to claim 4, wherein the heat resistant, and water or steam resistant pigment is chosen from among Pigment Blue 60 and Pigment Blue 15:3.

6. The ink composition according to claim 4, wherein the heat sensitive, and water or steam sensitive, dye is Solvent red 160.

7. The ink composition according to claim 1, comprising from 0.5 to 15% by weight of the heat resistant, and water or steam resistant pigment.

8. The ink composition according to claim 1, comprising from 0.5 to 15% by weight of the heat sensitive, and water or steam sensitive, dye.

9. The ink composition according to claim 1, wherein the binding resin(s) is (are) selected from (meth) acrylic, vinylic, and combinations thereof.

10. The ink composition according to claim 1, wherein the binder represents from 0.1 to 50% by weight of the total weight of the ink composition.

11. The ink composition according to claim 1, in which the solvent represents from 20 to 99% by weight of the total weight of the ink composition.

12. The ink composition according to claim 1, in which said organic solvent compound(s) of the solvent is (are) selected from among alcohols; ketones;
    alkylene glycols ethers; alkylene glycols esters and esters of alkylene glycols ethers; dimethyl formamide; N-methyl pyrrolidone; acetals; esters; linear or cyclic ethers; aliphatic, cyclic or linear hydrocarbons; aromatic hydrocarbons; carbonates; and mixtures thereof.

13. The ink composition according to claim 1, in which the solvent comprises a majority amount by weight (50% or more by weight) relative to the total weight of the solvent, of one or several solvent compound(s) selected from among ketones with 3 to 10 carbon atoms.

14. The ink composition according to claim 13, in which the solvent comprises a majority amount by weight relative to the total weight of the solvent of MEK.

15. The ink composition according claim 1, in which the solvent consists of one or several solvent compound(s) selected from among ketones with 3 to 10 carbon atoms.

16. The ink composition according to claim 1, also comprising at least one conductivity salt.

17. The ink composition according to claim 1, that has a conductivity in the liquid state greater than or equal to 5 µS/cm at 20° C.

18. A method for marking a substrate, support or object, article, by spraying an ink onto this substrate, support or object, article, using an ink jet printing technique, characterized in that the sprayed ink is an ink composition according to claim 1.

19. A substrate, support, object or article comprising a marking obtained by drying and/or absorption of the ink composition according to claim 1.

20. A substrate, support or object, article, according to claim 19 wherein the substrate, support or object, article is made of metal; of an alloy; of glass; of ceramic; of a material containing cellulose; of an organic polymer; of polymethyl methacrylate PMMA (plexiglass); of fabric; of natural or synthetic rubber; or of any other non-porous or porous substance; or of a composite of several of the above materials.

21. A method of indicating sterilization or pasteurization or autoclaving of a substrate, support or object, article, which comprises the following successive steps:
    a) marking said substrate, support or object, article by spraying an ink on said substrate, support or object, article, using an ink jet printing technique, the sprayed ink being an ink composition according to claim 1, whereby a marked substrate, support or object, article, having a marking on at least one surface is obtained;
    b) exposing the marked substrate, support or object, article to a temperature of between 100 and 140° C. in the presence of water or steam during a period of between 10 minutes to 2 hours so that the colour of the marking printed using said ink composition changes to the colour of the heat resistant, and water or steam resistant pigment.

22. The ink composition according to claim 1, wherein the binding resin(s) is (are) selected from cellulosic, styrenic, epoxy, polyurethane, styrene-acrylate, alkoxysilane, and combinations thereof.

23. The ink composition according to claim 1, wherein the binding resin(s) is (are) selected from cellulosic, polyurethane, vinylic resins and the combinations of two or more of the latter.

24. The ink composition according to claim 1, wherein the binding resin(s) is (are) selected from vinyl acetate/vinyl chloride copolymers, cellulosic resins and combinations thereof.

25. The ink composition according to claim 1, wherein the binding resin(s) is (are) selected from vinyl acetate/vinyl chloride copolymers.

* * * * *